US011104753B2

(12) United States Patent
Okochi et al.

(10) Patent No.: US 11,104,753 B2
(45) Date of Patent: Aug. 31, 2021

(54) ORGANIC POLYMER FINE PARTICLES

(71) Applicant: NIPPON SHOKUBAI CO., LTD., Osaka (JP)

(72) Inventors: Hiroko Okochi, Hyogo (JP); Tomonari Takata, Hyogo (JP); Kazuaki Matsumoto, Osaka (JP); Yasutaka Nakatani, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/578,889

(22) PCT Filed: Jun. 2, 2016

(86) PCT No.: PCT/JP2016/066372
§ 371 (c)(1),
(2) Date: Dec. 1, 2017

(87) PCT Pub. No.: WO2016/195006
PCT Pub. Date: Dec. 8, 2016

(65) Prior Publication Data
US 2018/0171050 A1  Jun. 21, 2018

(30) Foreign Application Priority Data

Jun. 4, 2015 (JP) .............................. JP2015-114273
Mar. 31, 2016 (JP) .............................. JP2016-071143

(51) Int. Cl.
*C08F 220/14* (2006.01)
*C08J 5/18* (2006.01)
(Continued)

(52) U.S. Cl.
CPC ............ *C08F 220/14* (2013.01); *B32B 27/32* (2013.01); *C08F 2/18* (2013.01); *C08J 3/226* (2013.01);
(Continued)

(58) Field of Classification Search
CPC ...... C08F 220/14; C08F 2/18; C08F 2810/20; C08J 3/226; C08J 5/18; C08J 2423/12;
(Continued)

(56) References Cited

U.S. PATENT DOCUMENTS 5,420,218 A     5/1995   Toribuchi et al.
5,683,501 A *  11/1997   Tomihisa .................. C08F 8/12
                                                                 106/491
(Continued)

FOREIGN PATENT DOCUMENTS

JP          61-23628         2/1986
JP          62-95301         5/1987
(Continued)

OTHER PUBLICATIONS

Machine Translation of JP 2011-168632 (A). (Year: 2011).*
(Continued)

*Primary Examiner* — Brian Handville
(74) *Attorney, Agent, or Firm* — Wenderoth, Lind & Ponack, L.L.P.

(57) ABSTRACT

The purpose of the present invention is to provide an organic polymer fine particle which can be hardly fallen off from a film when used as an anti-blocking agent for a film. The organic polymer fine particle according to the present invention is characterized in comprising a (meth)acrylate polymer crosslinked by a bifunctional crosslinkable monomer and a hindered phenol antioxidant or a component derived therefrom, wherein a ratio of a structure unit composed of the bifunctional crosslinkable monomer in the (meth)acrylate polymer crosslinked by the bifunctional crosslinkable monomer is 5 mass % or more and 35 mass % or less, the sedimentation start time is 16 seconds or more, an amount of Al measured by a high-frequency inductively coupled plasma emission spectrometric analysis method is 1 ppm or
(Continued)

less, and an amount of a sulfur atom measured by a high-frequency inductively coupled plasma emission spectrometric analysis method is 300 ppm or less in the organic polymer fine particle.

5 Claims, 1 Drawing Sheet

(51) Int. Cl.
| | |
|---|---|
| C08F 2/18 | (2006.01) |
| C08L 101/00 | (2006.01) |
| B32B 27/32 | (2006.01) |
| C08J 3/22 | (2006.01) |
| C08L 23/12 | (2006.01) |

(52) U.S. Cl.
CPC .................. *C08J 5/18* (2013.01); *C08L 23/12* (2013.01); *C08L 101/00* (2013.01); *C08F 2810/20* (2013.01); *C08J 2323/12* (2013.01); *C08J 2423/12* (2013.01); *C08J 2433/12* (2013.01); *C08L 2203/16* (2013.01); *C08L 2205/06* (2013.01); *C08L 2310/00* (2013.01)

(58) Field of Classification Search
CPC ... C08J 2433/12; C08J 2323/12; B32B 27/32; C08L 23/12; C08L 101/00; C08L 2310/00; C08L 2203/16; C08L 2205/06
See application file for complete search history.

(56) References Cited

U.S. PATENT DOCUMENTS

| | | | |
|---|---|---|---|
| 5,789,506 | A | 8/1998 | Toribuchi et al. |
| 2003/0064237 | A1 | 4/2003 | Oishi et al. |
| 2008/0255258 | A1 | 10/2008 | Podszun et al. |
| 2012/0065337 | A1 | 3/2012 | Shoko et al. |
| 2013/0266797 | A1 | 10/2013 | Teramoto et al. |
| 2014/0350180 | A1* | 11/2014 | Yamamoto ............... C08F 20/10 524/732 |
| 2015/0005437 | A1* | 1/2015 | Teramoto ................ C08L 33/12 524/523 |
| 2015/0118454 | A1 | 4/2015 | Kwon et al. |
| 2016/0280936 | A1 | 9/2016 | Takenaka et al. |
| 2019/0055425 | A1 | 2/2019 | Takenaka et al. |

FOREIGN PATENT DOCUMENTS

| | | |
|---|---|---|
| JP | 02-149509 | 6/1990 |
| JP | 4-363303 | 12/1992 |
| JP | 5-155907 | 6/1993 |
| JP | 10-7730 | 1/1998 |
| JP | 11-12327 | 1/1999 |
| JP | 2000-38455 | 2/2000 |
| JP | 2001-151626 | 6/2001 |
| JP | 2003-171426 | 6/2003 |
| JP | 2006-307140 | 11/2006 |
| JP | 2007-534793 | 11/2007 |
| JP | 4034157 | 1/2008 |
| JP | 2009-209253 | 9/2009 |
| JP | 2010-95598 | 4/2010 |
| JP | 2010-195992 | 9/2010 |
| JP | 2010-275356 | 12/2010 |
| JP | 2011-168632 | 9/2011 |
| JP | 2012-092306 | 5/2012 |
| JP | 2013-227535 | 11/2013 |
| JP | 2014-091814 | 5/2014 |
| JP | 5572383 | 8/2014 |
| JP | 2014-231546 | 12/2014 |
| JP | 2015-4007 | 1/2015 |
| JP | 2015-67694 | 4/2015 |
| JP | 2015-67803 | 4/2015 |
| JP | 2015-523423 | 8/2015 |
| WO | WO-2008133147 A1 * | 11/2008 ............. C08K 5/005 |
| WO | 2015/071984 | 5/2015 |

OTHER PUBLICATIONS

Machine Translation of JP 2000-038455 A. (Year: 2000).*
Machine Translation of WO 2008/133147 A1. (Year: 2008).*
Notice of Submission of Information by Third Parties issued Oct. 30, 2018 in corresponding Japanese Patent application No. 2017-522240 with English translation.
International Search Report dated Aug. 30, 2016 in International (PCT) Application No. PCT/JP2016/066372.
Extended European Search Report dated Jan. 24, 2019 in corresponding European Application No. 16803440.3.
Notification of Reasons for Rejection dated Jan. 8, 2019 in corresponding Japanese Patent Application No. 2017-522240, with English translation.
Notice of Submission of Information by Third Paities issued Dec. 4, 2018 in corresponding Japanese Patent Application No. 2017-522240 with English translation.
Office Action dated May 22, 2018 in Japanese Patent Application No. 2017-522240, with English-language translation.
Office Action dated Jul. 25, 2018 in European Patent Application No. 16803440.3.
Notice of Submission of Information by Third Parties dated May 21, 2019 in corresponding Japanese Patent Application No. 2017-522240 with English translation.
Notification of Reasons for Rejection dated Jun. 11, 2019 in corresponding Japanese Patent Application No. 2017-522240 with English translation.
Office Action dated Jul. 30, 2019 in corresponding Chinese Patent Application No. 201680032307.7 with English translation.
Decision of Rejection issued Mar. 31, 2020 in Japanese Patent Application No. 2017-522240, with English Translation.
Office Action dated Apr. 15, 2020 in Chinese Patent Application No. 201680032307.7, with English Translation.
Notice of Submission of Information by Third Parties issued Dec. 3, 2019 in corresponding Japanese Application No. 2017-522240, with English translation.
Report on Pre-Trial Examination issued Sep. 14, 2020 in Japanese Patent Application No. 2017-522240, with English Translation.
Office Action dated Aug. 12, 2020 in corresponding European Patent Application No. 16803440.3.
Notice of Submission of Information by Third Parties issued Nov. 10, 2020 in corresponding Japanese Application No. 2017-522240, with English translation.
Office Action dated Dec. 2, 2020 in corresponding Chinese Patent Application No. 201680032307.7, with English translation.
Decision of Rejection dated Mar. 10, 2021 in corresponding Chinese Patent Application No. 201680032307.7, with English translation.
Submission of Information by Third Parties dated Apr. 13, 2021 in corresponding Japanese Patent Application No. 2017-522240, with English Machine translation.
"What is a microscope?", Olympus Lifescience Solution, searched on Mar. 22, 2021 <https:www.olympus-lifescience.com/ja/support/learn/02/027/>, with English Machine translation and Cited in CB.
Nagata et al., "How big do you know?", Aug. 24, 2015, School of Media Science, Tokyo University of Technology, <http://blog.media.teu.ac.jp/2015/08/post-d509.html>, with English Machine translation and Cited in CB.
Nakajima et al., "A study on the Relationship between Defect characteristics and Conspicuity Field in Visual Inspection", 2015, vol. 51, No. 5, <https://www.jstage.jst.go.jp/article/jje/51/5/51 333/_pdf/-char/ja>, with Partial English translation and Cited in CB.
Submission of Information by Third Parties dated Jun. 22, 2021 in corresponding European Patent Application No. 16803440.3.

* cited by examiner

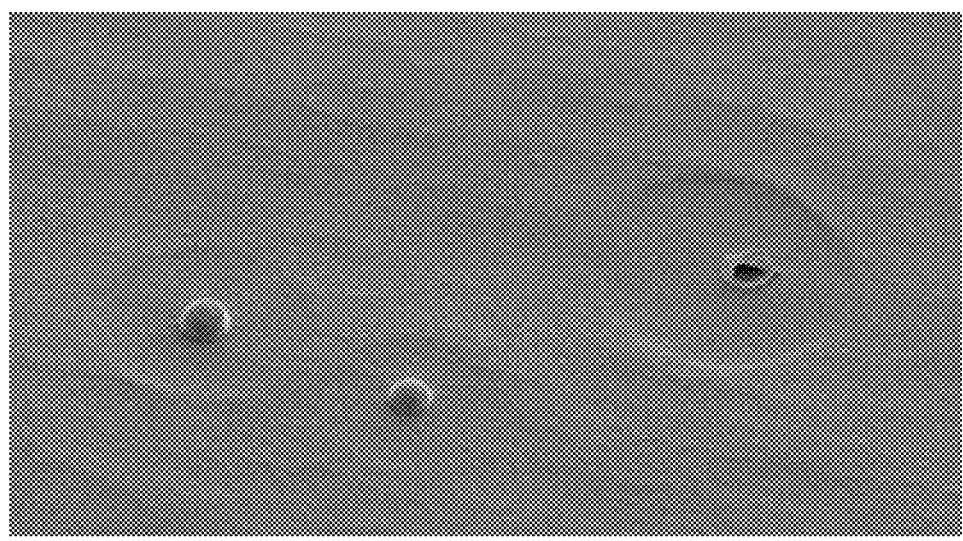

ORGANIC POLYMER FINE PARTICLES

TECHNICAL FIELD

The present invention relates to an organic polymer fine particle comprising a (meth)acrylate polymer crosslinked by a bifunctional crosslinkable monomer.

BACKGROUND ART

A resin film is widely used as various packaging materials. When a resin film is stored in a rolled or stacked state, blocking occurs between the films, so that the films may be less likely to slide or be peeled off. To prevent such blocking, an anti-blocking agent is used. The term "film" simply described herein is referred to as a "resin film" unless otherwise indicated.

As an anti-blocking agent, a resin fine particle is widely used from the viewpoints of maintaining transparency of a film and suppressing a film from being damaged. As such a resin fine particle, for example, Patent Document 1 discloses an organic polymer fine particle containing a sulfur-based antioxidant. In addition, Patent Document 2 discloses a (meth)acrylic crosslinked fine particle which is free from an impurity such as a decomposition product of 2,2'-azobisisobutyronitrile (AIBN) and in which an amount of remained (meth)acrylic monomer is 2000 ppm or less. Further, Patent Document 3 discloses an organic polymer fine particle containing at least one kind of bifunctional or higher polyfunctional monomer as a crosslinking agent.

PRIOR ART DOCUMENT

Patent Document

Patent Document 1: JP 5572383 B
Patent Document 2: JP 4034157 B
Patent Document 3: JP 2010-275356 A

DISCLOSURE OF THE INVENTION

Problems to be Solved by the Invention

In recent years, a film stretching speed has been increased to achieve higher production speed. As a result, a conventionally used anti-blocking agent cannot fully prevent a fine particle from defluvium from a film during stretching. In addition, when films are rubbed each other to be frictioned, an anti-blocking agent may also fail to avoid defluvium of a fine particle from the film. The present invention was completed under such circumstances. An objective of the present invention is to provide an organic polymer fine particle which can be hardly fallen off from a film when used as an anti-blocking agent for a film.

Means for Solving the Problems

In general, mechanical properties are different between a film and an organic polymer fine particle, and such difference causes a different response to a stress during stretching or rubbing of a film. As a result, an organic polymer fine particle is easily fallen off. The inventors of the present invention made extensive studies to solve the above problems from the standpoint of the above-described fact, and surprisingly found that the larger the variation speed of the stress becomes, the more the surface characteristics of an organic polymer fine particle is affected. In addition, the inventors also found that an enhancement of a hydrophobicity of an organic polymer fine particle tends to induce suppression of defluvium of the organic polymer fine particle from a film, in particular, when the organic polymer fine particle have a reduced Al content while suppressing hydrophilization of the surfaces, defluvium of the fine particle from a film is suppressed during stretching and rubbing of the film. The inventors finally found that such characteristics are achieved by adjusting suspension polymerization condition, and also subjecting the resulting reaction solution to solid-liquid separation without using an aluminum based flocculant, to collect an organic polymer fine particle. The present invention was accomplished based on the above findings.

Usually, an aluminum based flocculant such as aluminum sulfate is essential when a fine particle is collected from a reaction suspension. Without using an aluminum based flocculant, a fine particle is practically difficult to be collected. However, an addition of a flocculant is obvious and is not characteristic, so that even though a flocculant is used, it is rare to intentionally describe the use. In the present invention, a description of the use of a flocculant such as aluminum sulfur is not omitted, but the present invention is characterized in that a flocculant is intentionally not used.

As a result of further studies, the inventors completed the present invention by also finding that even though a hydrophobicity of an organic polymer fine particle is slightly reduced, defluvium of the organic polymer fine particle from a film is suppressed as long as a specific oxidant or a component derived from a specific oxidant is contained in the particle.

The organic polymer fine particle according to the present invention is characterized in comprising a (meth)acrylate polymer crosslinked by a bifunctional crosslinkable monomer and a hindered phenol antioxidant or a component derived therefrom, wherein a ratio of a structure unit composed of the bifunctional crosslinkable monomer in the (meth)acrylate polymer crosslinked by the bifunctional crosslinkable monomer is 5 mass % or more and 35 mass % or less, the following sedimentation start time is 16 seconds or more, wherein the sedimentation start time is defined as a time from when 0.02±0.005 g of the organic polymer fine particle is gently put on the surface of 20 mL of deionized water having a temperature of 20° C. in a glass container having a cross-sectional area of 5 $cm^2$ or more and 10 $cm^2$ or less until when one of the organic polymer fine particle first begins to sediment, an amount of Al measured by a high-frequency inductively coupled plasma emission spectrometric analysis method is 1 ppm or less, and an amount of a sulfur atom measured by a high-frequency inductively coupled plasma emission spectrometric analysis method is 300 ppm or less in the organic polymer fine particle.

The organic polymer fine particle according to the present invention is characterized in comprising a (meth)acrylate polymer crosslinked by a bifunctional crosslinkable monomer and 0.2 mass % or more of a hindered phenol antioxidant or a component derived therefrom, wherein a ratio of a structure unit composed of the bifunctional crosslinkable monomer in the (meth)acrylate polymer crosslinked by the bifunctional crosslinkable monomer is 5 mass % or more and 35 mass % or less, the following sedimentation start time is 10 seconds or more, wherein the sedimentation start time is defined as a time from when 0.02±0.005 g of the organic polymer fine particle is gently put on the surface of 20 mL of deionized water having a temperature of 20° C. in a glass container having a cross-sectional area of 5 $cm^2$ or more and 10 $cm^2$ or less until when one of the organic polymer fine particle first begins to sediment, and an amount of Al measured by a high-frequency inductively coupled plasma emission spectrometric analysis method is 1 ppm or less in the organic polymer fine particle.

In the organic polymer fine particle of the present invention, it is preferred that the bifunctional crosslinkable monomer is a monomer having two (meth)acryloyl groups.

It is preferred that a mass average particle diameter of the organic polymer fine particle of the present invention is 1.0 μm or more and 15 μm or less.

The organic polymer fine particle of the present invention is preferably used as an anti-blocking agent for a film.

A method for producing an organic polymer fine particle is included in the technical scope of the present invention. The method is characterized in comprising the steps of subjecting a (meth)acrylate monomer and a bifunctional crosslinkable monomer in a total amount of 100 parts by mass to a suspension polymerization in the presence of 0.1 parts by mass or more and 2.5 parts by mass or less of a polymerization initiator and 0.2 parts by mass or more and 1 part by mass or less of an antioxidant, and obtaining a polymer by solid-liquid separation without adding an aluminum flocculant.

In the method of organic polymer fine particle of the present invention, it is preferred that 50 parts by mass or more of a hindered phenol antioxidant is contained in 100 parts by mass of the antioxidant.

In the method of organic polymer fine particle of the present invention, the hindered phenol antioxidant as an antioxidant and the polymerization initiator may be used in a ratio of the hindered phenol antioxidant/the polymerization initiator of 0.2 or more and 10 or less during the suspension polymerization.

Furthermore, the masterbatch, comprising the organic polymer fine particle and a resin is also a preferred embodiment of the present invention. It is preferred that the resin is a polyolefin resin.

A resin film, comprising the organic polymer fine particle and a resin is included in the technical scope of the present invention. It is preferred that a content rate of the organic polymer fine particle is 0.01 mass % or more and 10 mass % or less. It is preferred that a thickness of the resin film is 0.1 μm or more and 1 mm or less.

Furthermore, a laminate film, comprising at least one layer of the resin film and a base material film is also a preferred embodiment of the present invention.

Effect of the Invention

The organic polymer fine particle of the present invention has a reduced Al content while suppressing hydrophilization of the surfaces, thereby suppressing defluvium of the organic polymer fine particle from a resin film.

BRIEF DESCRIPTION OF THE DRAWINGS

FIG. 1 is a scanning electron micrograph image at 500× magnification showing protrusions and a defluvium trace formed by an organic polymer fine particle on the surface of a resin film.

MODE FOR CARRYING OUT THE INVENTION

1. Organic Polymer Fine Particle

The organic polymer fine particle of the present invention comprises a (meth)acrylic polymer crosslinked by a bifunctional monomer. The (meth)acrylic polymer is hereinafter referred to as "crosslinked (meth)acrylic polymer". As a result, a hydrophobicity of the organic polymer fine particle is enhanced, in particular, hydrophilization of the surfaces is suppressed. In addition, an amount of Al is reduced. An adhesion between the organic polymer fine particle and a resin film can be therefore maintained during stretching or after rubbing of the resin film, and defluvium of the organic polymer fine particle from the resin film can be suppressed.

Specifically, the organic polymer fine particle of the present invention meets a criterion for high hydrophobicity such that the following precipitation start time is 10 seconds or more or 16 seconds or more. When the time is 16 seconds or more, defluvium of the fine particle from a film can be suppressed. In order to insure such suppression of the defluvium of the fine particle in a case where the precipitation start time of 16 seconds or more, it is suitable to contain a hindered phenol antioxidant or a component derived from a hindered phenol antioxidant in the fine particle. Even when the precipitation start time is 10 seconds or more and less than 16 seconds, the defluvium of the fine particle from a film can be prevented by containing a predetermined amount or more of a hindered phenol antioxidant or a component derived therefrom in the particle as described later.

[Precipitation Start Time]

A glass container having a cross-sectional area of 5 cm$^2$ or more and 10 cm$^2$ or less filled with 20 mL deionized water having a liquid temperature of 20 C° is prepared. A time from when 0.02±0.005 g of organic polymer fine particles are gently floated on a water surface until when the first particle starts to precipitate is determined as a precipitation start time.

When the organic polymer fine particles are floated on a water surface, the particles are placed on a spatula and then set on a water surface in the vicinity thereof, thereby achieving gentle floating on the water surface. The start of precipitation is a timing when the first particle of the organic polymer fine particle floated on the water surface starts to precipitate.

The above precipitation start time is determined by measuring the time at least twice and averaging the measurement values.

The organic polymer fine particle has a larger density than water, for example, 1.05 g/cm$^3$ or more, preferably 1.1 g/cm$^3$ or more, more preferably 1.15 g/cm$^3$ or more. With respect to the upper limit of such density, for example, the density may be 1.3 g/cm$^3$ or less, preferably 1.2 g/cm$^3$ or less. The shape of the particle is basically round, such as spherical, porous, protruded and oval, and the surface of the particle may be modified as long as the performance is not impaired.

In the present invention, the organic polymer fine particle is heavier than water but floats on a water surface for a long time due to higher hydrophobicity. As a result, defluvium of the fine particle from a resin film is suppressed. The precipitation start time is preferably 16 seconds or more, more preferably 20 seconds or more, even more preferably 25 seconds or more, particularly preferably 60 seconds or more.

Since an amount of Al in the organic polymer fine particle of the present invention is reduced, residual hydration water is reduced and a higher hydrophobicity of the surface of the organic polymer fine particle is maintained. Thus, an amount of Al is preferably 1 ppm or less, more preferably 0.5 ppm or less, even more preferably 0.1 ppm or less, in the organic polymer fine particle.

An amount of Al can be measured by inductively coupled plasma (ICP) emission spectral analysis method.

The moisture content of the organic polymer fine particle is preferably 1% by mass or less. The moisture content can be measured by the Karl Fischer method.

The content of a sulfur element in the organic polymer fine particle is, in terms of an amount of a sulfur atom, preferably 300 ppm or less, more preferably 200 ppm or less, even more preferably 100 ppm or less, even more preferably 10 ppm or less, particularly preferably less than 1 ppm.

A crosslinked (meth)acrylic polymer which is contained in the particle of the present invention is formed of a (A) (meth)acrylic monomer and a (B1) bifunctional crosslinkable monomer.

The above (A) (meth)acrylic monomer may be used alone, or in mixture of two or more kinds. Examples thereof include (meth)acrylic acid; a monoalkyl (meth)acrylate such as methyl (meth)acrylate, ethyl (meth)acrylate, propyl (meth)acrylate, n-butyl (meth)acrylate, isobutyl (meth)acrylate, t-butyl (meth)acrylate, octyl (meth)acrylate, 2-ethylhexyl (meth)acrylate, dodecyl (meth)acrylate and stearyl (meth)acrylate; and a monocyclic ether-containing acrylate such as tetrahydrofurfuryl (meth)acrylate.

As the (A) (meth)acrylic monomer, a monoalkyl (meth)acrylate is preferable. From the viewpoint of easy formation of the particle, methyl (meth)acrylate is particularly preferable. As a (meth)acrylate monomer, a methacrylic monomer is preferable.

As a (B1) bifunctional crosslinkable monomer which crosslinks the crosslinked (meth)acrylic polymer, a monomer having two polymerizable functional groups which is copolymerizable with the (A) (meth)acrylic monomer may be used, and examples of the polymerizable functional group include a vinyl group and a (meth)acryloyl group. Among the examples, a (meth)acryloyl group is preferable, and a methacryloyl group is particularly preferable.

The number of elements which constitute the shortest linear chain between the two polymerizable functional groups is preferably 2 or more, more preferably 3 or more. The number thereof is preferably 15 or less, more preferably 9 or less. The number of oxygen atoms in the elements is preferably 4 or less, more preferably 3 or less. The number thereof is preferably 2 or more. Further, from the viewpoint of enhancing hydrophobicity, the number of oxygen atoms contained in one molecule of the (B1) bifunctional crosslinkable monomer is preferably small.

The (B1) bifunctional crosslinkable monomers may be used alone or in mixture of two or more kinds. Specific examples thereof include an alkane diol di(meth)acrylate such as ethylene glycol di(meth)acrylate, 1,4-butanediol di(meth)acrylate, 1,6-hexanediol di(meth)acrylate, and 1,9-nonanediol di(meth)acrylate; an alkene di(meth)acrylate such as 1,3-butylene di(meth)acrylate; and polyethylene glycol di(meth)acrylate. The number of repeating ethylene glycol units of polyethylene glycol di(meth)acrylate is preferably small from the viewpoints of handleability and hydrophobicity, for example, preferably in the range of 2 to 150, more preferably 2 to 23, even more preferably 2 to 5, most preferably 2 or 3. The smaller the number of repeating ethylene glycol units, the lower the melting point of the polyethylene glycol di(meth)acrylate becomes. As a result, polyethylene glycol di(meth)acrylate is liquid at room temperature, so that the handleability is enhanced.

Among the above examples, an alkane diol di(meth)acrylate is preferable as the bifunctional crosslinkable monomer.

An amount of the (B1) bifunctional crosslinkable monomer in the above-mentioned crosslinked (meth)acrylic polymer may be 5% by mass or more, preferably 10% by mass or more, more preferably 15% by mass or more, and may be 35% by mass or less, preferably 30% by mass or less, more preferably 25% by mass or less. When the (B1) bifunctional crosslinkable monomer is used in a predetermined amount or more, the hardness of the organic polymer fine particle can be secured. Thus, the particle having appropriate property as an anti-blocking agent can be obtained, and for example, when the particle is added to a film, the coefficient of friction between the particle and a film can be reliably lowered.

In the organic polymer fine particle of the present invention, a structural unit formed of a (B2) crosslinkable monomer other than the above-mentioned (B1) bifunctional crosslinkable monomer may be contained. Such crosslinkable monomer may be used alone or in mixture of two or more kinds. Examples thereof include a tetrafunctional (meth)acrylic monomer such as pentaerythritol tetra (meth)acrylate; and a hexafunctional (meth)acrylic monomer such as dipentaerythritol hexa (meth)acrylate.

An amount of the (B) total crosslinkable monomer, i.e. a total of a (B1) bifunctional crosslinkable monomer and a (B2) crosslinkable monomer other than (B1), in the above-mentioned crosslinked (meth)acrylic polymer is preferably 5% by mass or more, more preferably 10% by mass or more, even more preferably 15% by mass or more, and preferably 35% by mass or less, more preferably 30% by mass or less, even more preferably 25% by mass or less.

An amount of a (B1) bifunctional crosslinkable monomer in the (B) total crosslinkable monomer is preferably 80% by mass or more, more preferably 90% by mass or more, even more preferably 95% by mass or more, particularly preferably 98% by mass or more, most preferably 100% by mass.

An amount of the total of a (A) (meth)acrylic monomer and a (B1) bifunctional crosslinkable monomer in all the monomer which constitutes the organic polymer fine particle is preferably 80% by mass or more, more preferably 90% by mass or more, even more preferably 95% by mass or more, particularly preferably 98% by mass or more, most preferably 100% by mass.

Further, the organic polymer fine particle of the present invention may contain one or in mixture of two or more kinds of (C) other monomer which are copolymerizable with the (meth)acrylic monomer described above. Examples thereof include a styrene monomer such as styrene, o-methyl styrene, m-methyl styrene, p-methyl styrene, α-methyl styrene, p-methoxy styrene, p-tert-butyl styrene, p-phenyl styrene, o-chloro styrene, m-chloro styrene, p-chloro styrene and ethyl vinyl benzene; an aromatic divinyl compound such as m-divinylbenzene, p-divinylbenzene, divinyl naphthalene and derivatives thereof; a crosslinking agent such as N,N-divinylaniline, divinylether, divinylsulfide and divinylsulfonic acid; polybutadiene; and a reactive polymer disclosed in JP-B-57-56507, JP-A-59-221304, JP-A-59-221305, JP-A-59-221306, and JP-A-59-221307. An amount of the (C) other monomer in all the monomers which constitute the organic polymer fine particle is preferably 10% by mass or less, more preferably 5% by mass or less, even more preferably 2% by mass or less.

The organic polymer fine particle of the present invention has a mass average particle size (Dw) of preferably 0.5 μm or more, more preferably 1.0 μm or more, even more preferably 2.0 μm or more. The organic polymer fine particle also has a Dw of preferably 40 μm or less, more preferably 30 μm or less, even more preferably 15 μm or less, particularly preferably 10 μm or less, most preferably 8 μm or less.

In the case of using the organic polymer fine particle of the present invention in a resin film, the organic polymer fine particle having a mass average particle size in the above range can be appropriately used. In particular, it is preferable to vary a particle size depending on the thickness of a resin film. The mass average particle size of the organic polymer fine particle is preferably 10 times or less, preferably 8 times or less, more preferably 6 times or less, than the thickness of the resin film. The mass average particle size of the organic polymer fine particle may be 0.1 times or more, preferably 0.5 times or more, more preferably 1 time or more, than the thickness the resin film, although the lower limit is not particularly limited. When the value of the mass average particle size of the organic polymer fine particle relative to the thickness of a resin film is within the above range, defluvium of the particle from the film can be suppressed while the coefficient of friction is kept low. As a result, an adverse effect on productivity of a film or transparency of a produced film which is caused by contamination of a film manufacturing device by a fallen organic polymer fine particle can be reduced during production of the film.

The ratio of a number average particle size (Dn) and the mass average particle size (Dw) of the organic polymer fine particle, i.e. (Dn/Dw), is for example, 0.3 or more, preferably 0.4 or more, and may be a high value of 0.6 or more. The Dn/Dw is an index of monodispersity of a particle size, indicating that the higher the value, the smaller the proportion of fine particles. As the Dn/Dw value approaches 1, particles are monodispersed. By setting the Dn/Dw closer to 1, defluvium of the particle can be further appropriately prevented. As the upper limit of Dn/Dw, 1 or less and 0.9 or less are exemplified.

The coefficient of variation (CV value) of the particle size of the organic polymer fine particle is a value obtained in particle size distribution on a mass basis and is preferably 50% or less, more preferably 45% or less, even more preferably 40% or less. The coefficient of variation thereof is preferably 10% or more, preferably 20% or more, even more preferably 30% or more, particularly preferably 35% or more. The CV value represents a grain size distribution, and a particle can be appropriately prevented from being fallen off by setting the CV value to a suitable numerical value.

The above-mentioned particle size can be measured with a precision grain size distribution measuring device adopting the Coulter principle (e.g., "Coulter Multisizer III" manufactured by Beckman Coulter, Inc.). A particle size is measured as a mass average particle size (Dw) and a number average particle size (Dn), and the coefficient of variation (CV value) of the mass average particle size can be calculated according to the following formula.

Coefficient of variation (%) of average particle size (Dw)=(standard deviation σ of average particle size (Dw)/average particle size (Dw))×100

The organic polymer fine particle may be classified as required in order to set the particle size (Dw, Dn), the ratio thereof (Dn/Dw), coefficient of variation (CV) or the like in the predetermined ranges. Either wet classification or dry classification can be adopted to classify the particle. The wet classification can be performed, for example, by letting a polymerized polymeric liquid pass through a metallic mesh. The dry classification can be performed by using an appropriate classification device with polymerized particles that have been further dried and pulverized.

As described above, the precipitation start time of the organic polymer fine particle of the present invention may be less than 16 seconds. Even in such case, the precipitation start time is 10 seconds or more, preferably 12 seconds or more, more preferably 14 seconds or more. As long as the precipitation start time is set in the above range, the defluvium of the fine particle from a film can be prevented by containing a predetermined amount or more of a hindered phenol antioxidant or a component derived therefrom in the particle. Of course, a hindered phenol antioxidant or a component derived therefrom may be contained in a predetermined amount or more in the above-mentioned fine particle of which the precipitation start time is 16 seconds or more. A hindered phenol antioxidant or a component derived therefrom may be a component in which an antioxidant used in polymerization of an organic polymer fine particle has remained in the organic polymer fine particle, or may be a component mixed with a hindered phenol antioxidant or a component derived therefrom at an appropriate stage, for example after drying of the particle, after polymerization of the organic polymer fine particle.

An amount of a hindered phenol antioxidant or a component derived therefrom in the organic polymer fine particle is, for example, 0.2% by mass or more, preferably 0.25% by mass or more, more preferably 0.35% by mass or more. An amount thereof is, for example, 2% by mass or less, preferably 1% by mass or less, more preferably 0.6% by mass or less.

An amount of a hindered phenol antioxidant or a component derived therefrom in the organic polymer fine particle can be determined by following step: For example, the organic polymer fine particle is pulverized in an appropriate manner as required, then a hindered phenol antioxidant or a component derived therefrom extracted with a suitable organic solvent such as chloroform. Then, quantitative analysis is performed by chromatography or the like.

In the organic polymer fine particle of the present invention, the hydrophilization thereof is suppressed and an amount of Al is reduced. Even if the organic polymer fine particle is a little hydrophilic, the organic polymer fine particle contains a hindered phenol antioxidant or a component derived therefrom. The organic polymer fine particle is therefore highly suppressed from defluvium from a film and is suitably used as an anti-blocking agent, a slip additive, or the like for various films.

2. Manufacturing Method

The organic polymer fine particle of the present invention can be produced by the following step: The (A) (meth) acrylic monomer and (B1) bifunctional crosslinkable monomer described above are subjected to suspension polymerization in the presence of a polymerization initiator and an antioxidant, and the resulting product is subjected to solid-liquid separation without adding at least an aluminum based flocculant, so that polymer is collected.

It is important that an amount of a polymerization initiator is suppressed to let an antioxidant coexist. Then, the organic polymer fine particle can achieves predetermined hydrophobicity, that is, precipitation start time of 10 seconds or more, particularly 16 seconds or more.

The suppression of an amount of a polymerization initiator allows an amount of the reaction residue of the remaining polymerization initiator to be controlled, so that the hydrophobicity of the polymer fine particle thus obtained can be enhanced. Further, by suppressing an amount of a polymerization initiator to let an antioxidant coexist, the polymerization reaction is inhibited, so that polymerization of (A) (meth)acrylic monomer and (B1) bifunctional crosslinkable monomer tends to uniformly proceed. As a result, hydrophilization of the surface of the organic polymer fine particle thus obtained is suppressed.

Therefore, an amount of a polymerization initiator is 2.5 parts by mass or less, more preferably 1.8 parts by mass or less, even more preferably 1.6 parts by mass or less, particularly preferably 1.5 parts by mass or less, based on 100 parts by mass of the total of (A) (meth)acrylic monomer and (B1) bifunctional crosslinkable monomer. An amount thereof is 0.1 parts by mass or more, preferably 0.2 parts by mass or more.

An amount of an antioxidant is preferably 0.1 parts by mass or more, more preferably 0.2 parts by mass or more, particularly preferably 0.3 parts by mass or more, based on 100 parts by mass of the total of (A) (meth)acrylic monomer and (B1) bifunctional crosslinkable monomer. An amount thereof is 1 part by mass or less, more preferably 0.7 parts by mass or less.

Further, in the present invention, when the organic polymer fine particle thus obtained is collected, at least an aluminum based flocculant is not added and usually a flocculant itself including the aluminum based flocculant is not added. A flocculant is usually used when the fine particle is collected from a fine particle suspension. Even with a fine particle suspension in which the fine particle is dispersed in the solvent and difficult to be collected by solid-liquid separation, the fine particle can be flocculated and precipitated, so that the collection rate of the fine particle can be increased. In the present invention, however, the inventors found that intentionally avoiding the use of such flocculant allows the surfaces of an organic polymer fine particle to have increased hydrophobicity.

Examples of the aluminum based flocculant which is well-known or commonly used but the use of is specifically avoided in the present invention include an aluminum salt such as aluminum chloride, aluminum sulfate, polyaluminum chloride and polyaluminum hydroxide; and an aluminum complex.

A method for producing the organic polymer fine particle of the present invention is described hereinbelow step by step.

In the suspension polymerization, first, the (A) (meth) acrylic monomer and the (B1) bifunctional crosslinkable monomer, and optionally (B2) other crosslinkable monomer or (C) other monomer are dispersed in a solvent and then suspended, to thereby obtain a monomer suspension. The monomers in the monomer suspension thus obtained are polymerized, so that a suspension of the organic polymer fine particle can be obtained.

As the polymerization initiator, a radical polymerization initiator can be preferably used. As the radical polymerization initiator, a thermal polymerization initiator is preferable, and, for example, a peroxide polymerization initiator and an azo compound polymerization initiator may be used. Among the examples, a peroxide polymerization initiator is preferable. Examples of the peroxide polymerization initiator include a peroxide having a structure represented by C(O)OOC(O), such as benzoyl peroxide, lauroyl peroxide, octanoyl peroxide, orthochloro benzoyl peroxide, orthomethoxy benzoyl peroxide and diisopropyl peroxy dicarbonate; a peroxide having a structure represented by COOC, such as cyclohexanone peroxide, t-hexyl peroxy-2-ethylhexanoate (trade name: PERHEXL® 0) and 1,1-di(t-hexylperoxy)cyclohexane (trade name: PERHEXA® HC); a peroxide having a structure represented by COOH, such as cumene hydroperoxide and t-butyl hydroperoxide; a dimeric ketone peroxide such as methyl ethyl ketone peroxide; and diisopropylbenzene hydroperoxide. Examples of the azo compound polymerization initiator include 2,2'-azobisisobutyronitrile, 2,2'-azobis(2,4-dimethylvaleronitrile), 2,2'-azobis(2,3-dimethylbutyronitrile), 2,2'-azobis-(2-methylbutyronitrile), 2,2'-azobis(2,3,3-trimethylbutyronitrile), 2,2'-azobis(2-isopropylbutyronitrile), 1,1'-azobis (cyclohexane-1-carbonitrile), 2,2'-4-methoxy-2,4-dimethylvaleronitrile), 2-(carbamoylazo) isobutyronitrile, 4,4'-azobis (4-cyanovaleric acid) and dimethyl-2,2'-azobis isobutyrate.

It is preferred that a polymerization initiator has a ten-hour half-life temperature in the range of 40 to 90° C., preferably 40 to 80° C., more preferably 50 to 70° C. When the ten-hour half-life temperature of the polymerization initiator is within the above range, the polymerization reaction is easily controlled and the polymerization initiator is also easily removed by a temperature rise.

The polymerization initiator may be used alone or in combination of two or more kinds. In the case of using two or more kinds of polymerization initiators, it is preferable to combine polymerization initiators having different ten-hour half-life temperatures. Such a combination allows the polymerization initiator having a higher half-life temperature to be decomposed at a temperature rising stage under polymerization or during aging time at a high temperature. As a result, the polymerization further proceeds.

In the case of combining the polymerization initiators having different ten-hour half-life temperatures, a polymerization initiator having the lowest ten-hour half-life temperature in the range of, for example, 40 to 80° C. is preferable, one in the range of 50 to 70° C. is more preferable, one in the range of 50 to 65° C. is most preferable. Specific examples thereof include lauryl peroxide having ten-hour half-life temperature of 61.6° C.

In the case of combining the polymerization initiators having different ten-hour half-life temperatures, the ten-hour half-life temperature of the polymerization initiator having the highest ten-hour half-life temperature is recommended to be, for example, 5° C. or higher, preferably 10° C. or higher, more preferably 15° C. or higher than the polymerization initiator having the lowest ten-hour half-life temperature. For example, when lauryl peroxide having ten-hour half-life temperature of 61.6° C. is selected as the polymerization initiator having the lowest ten-hour half-life temperature, t-hexyl peroxy-2-ethylhexanoate (trade name: PERHEXL® 0) (ten-hour half-life temperature: 69.9° C.), 1,1-di(t-hexylperoxy)cyclohexane (trade name: PERHEXA® HC) (ten-hour half-life temperature: 87.1° C.), or the like can be selected as the polymerization initiator having the highest ten-hour half-life temperature.

The coexistence of an antioxidant can enhance heat resistance of the organic polymer fine particle thus obtained. As the antioxidant, one having radical capturing effect is preferably contained, and at least a hindered phenol antioxidant is preferably contained. A hindered phenol antioxidant has a structure in which a bulky organic group such as tert-butyl group is substituted with the phenol at the ortho position, and has radical capturing effect.

The addition of such antioxidant to the particle can further enhance the hydrophobicity of the particle; as a result, the particle can be further highly prevented from being fallen off from a film.

The use of an antioxidant having radical capturing effect inhibits the proceeding of polymerization reaction. Therefore, usually, in order to allow the polymerization reaction to proceed, it is necessary to increase an amount of a polymerization initiator. In the present invention, it is noteworthy that the hydrophobicity of an organic polymer fine particle increases by intentionally reducing the amount of the polymerization initiator.

Specific examples of the hindered phenol antioxidant include pentaerythritol tetrakis[3-(3,5-di-tert-butyl-4-hydroxyphenyl)propionate] (trade name: IRGANOX® 1010), octadecyl 3-(3,5-di-tert-butyl-1-hydroxyphenyl)propionate, N,N'-hexane-1,6-diyl bis[3-(3,5-di-tert-butyl-4-hydroxyphenyl) propionamide], benzenepropanoic acid, 3,5-bis(1,1-dimethylethyl)-4-hydroxy, C7-C9 side chain alkyl ester, 3,3',3'',5,5',5''-hexa-tert-butyl-a,a',a''-(mesitylene-2,4,6-triyl)tri-p-cresol, calcium diethylbis[[[3,5-bis(1,1-dimethylethyl)-4-hydroxyphenyl]methyl]phosphonate], ethylenebis(oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-tri azine-2,4,6(1H,3H,5H)-trione, a reaction product of N-phenyl-benzenamine with 2,4,4-trimethylbenzene, diethyl[[3,5-bis(1,1-dimethylethyl)-4-hydroxyphenyl]methyl]phosphonate, 2,4-dimethyl-6-(1-methylpentadecyl)phenol, octadecyl-3-(3,5-tert-butyl-4-hydroxyphenyl)propionate, and 2',3-bis[3-(3,5-di-tert-butyl-4-hydroxyphenyl)propionyl]propionic acid hydrazide.

A hindered phenol antioxidant is contained in an amount of preferably 50 parts by mass or more, more preferably 80 parts by mass or more, even more preferably 90 parts by mass or more, particularly preferably 95 parts by mass or more, most preferably 98 parts by mass or more, based on 100 parts by mass of the total amount of the antioxidants, and the upper limit thereof is 100 parts by mass.

In addition, an amount of a hindered phenol antioxidant may be, for example, 0.2 parts by mass or more, preferably 0.3 parts by mass or more, more preferably 0.4 parts by mass or more, based on 100 parts by mass of the total of the monomers. An amount thereof may be, for example, 5 parts by mass or less, preferably 3 parts by mass or less, more preferably 2 parts by mass or less. The amount of the hindered phenol antioxidant itself is regulated to the monomer, so that an amount of the hindered phenol antioxidant in a polymer particle can be adjusted, thereby allowing the prevention against defluvium of the polymer particle from a film to be more reliably enhanced.

A hindered phenol antioxidant is desirably used in a specific range as compared with the polymerization initiator. A ratio of the hindered phenol antioxidant to the polymerization initiator, i.e. hindered phenol antioxidant/polymerization initiator, is, for example, 0.2 or more, preferably 0.25 or more, more preferably 0.3 or more, even more preferably 0.4 or more. The ratio is, for example, 10 or less, preferably 7 or less, more preferably 5 or less, even more preferably 2 or less. The amount of the hindered phenol antioxidant is regulated to the polymerization initiator, so that the amount of the hindered phenol antioxidant in a polymer particle can be adjusted, thereby allowing the prevention against defluvium of the polymer particle from a film to be more reliably enhanced.

In addition to the above-described antioxidant, a phosphorus antioxidant, a lactone antioxidant, a hydroxyamine antioxidant, a vitamin E antioxidant or the like may be used. As the phosphorus antioxidant, tris(2,4-di-tert-butylphenyl) phosphite, tris[2-[[2,4,8,10-tetra-tert-butyldibenzo[d,f][1,3,2]dioxaphosphephin-6-yl]oxy]ethyl]amine, bis(2,4-di-tert-butylphenyl)pentaerythritol diphosphate, bis[2,4-bis(1,1-dimethylethyl)-6-methylphenyl]ethyl ester phosphorous acid, and tetrakis(2,4-di-tert-butylphenyl)[1,1-biphenyl]-4 4'-diyl bis phosphonate are exemplified. As the lactone antioxidant, a reaction product of 3-hydroxy-5,7-di-tert-butyl-furan-2-one with o-xylene (CAS No. 181314-48-7) are exemplified.

As the hydroxyamine antioxidant, an oxidation product of alkylamine of which raw material is a reduced beef tallow is exemplified. As the vitamin E antioxidant, 3,4-dihydro-2,5,7,8-tetramethyl-2-(4,8,12-trimethyltridecyl)-2H-benzopyran-6-ol is exemplified.

Further, it is preferred not to use a sulfur antioxidant, in addition to the above-described antioxidant. Thus, the content of the sulfur antioxidant in the organic polymer fine particle is preferably less than 1 ppm in terms of an amount of a sulfur atom. Without using the sulfur antioxidant, the occurrence of odor can be suppressed.

Either an organic dispersion stabilizer or an inorganic dispersion stabilizer may be used as a dispersion stabilizer. Examples of an organic dispersion stabilizer include a water-soluble polymer, an anionic surfactant, a cationic surfactant, a nonionic surfactant, an ampholytic surfactant, alginate, zein, and casein. Examples of the inorganic dispersion stabilizer include barium sulfate, calcium sulfate, barium carbonate, magnesium carbonate, calcium phosphate, talc, clay, diatomaceous earth, bentonite, titanium hydroxide, sodium hydroxide, and a metal oxide powder.

The water-soluble polymer is exemplified by polyvinyl alcohol, gelatin, tragacanth, starch, methyl cellulose, carboxymethyl cellulose, hydroxyethyl cellulose, sodium polyacrylate, and sodium polymethacrylate.

Examples of the anionic surfactant include a fatty acid salt such as sodium oleate and castor oil potassium; an alkyl sulfate ester salt such as sodium lauryl sulfate and ammonium lauryl sulfate; an alkylbenzenesulfonic acid salt such as sodium dodecylbenzenesulfonate; an alkylnaphthalene sulfonic acid salt; an alkanesulfonic acid salt; a dialkylsulfosuccinic acid salt; an alkylphosphoric ester salt; a naphthalenesulfonic acid-formalin condensate; a polyoxyalkylene alkyl ether sulfuric acid salt such as polyoxyethylene alkyl ether sulfuric acid salt; a polyoxyalkylene aryl ether sulfuric acid ester salt such as polyoxyethylene phenyl ether sulfuric acid ester salt; and a polyoxyalkylene alkyl sulfuric acid ester salt such as polyoxyethylene alkyl sulfuric acid ester salt.

Examples of the cationic surfactant include an alkylamine salt such as laurylamine acetate and stearylamine acetate; and a quaternary ammonium salt such as lauryl trimethyl alkyl ammonium chloride.

Examples of the nonionic surfactant include polyoxyethylene alkyl ether, polyoxyethylene alkyl phenyl ether, polyoxyethylene sorbitan-fatty acid ester, sorbitan-fatty acid ester, polyoxy sorbitan-fatty acid ester, polyoxyethylene alkylamine, glycerol-fatty acid ester, and oxyethylene-oxypropylene block copolymer.

Examples of the amphoteric surfactant include lauryldimethylamine oxide.

From the viewpoints of high polymerization stability and suspension stability, an anionic surfactant is preferable, and a polyoxyalkylene aryl ether sulfuric acid salt is more preferable.

In this step, a surfactant is used in an amount of preferably 0.1 parts by mass or more, more preferably 0.5 parts by mass or more, and preferably 5 parts by mass or less, more preferably 3 parts by mass or less, even more preferably 2 parts by mass or less, based on 100 parts by mass of the total amount of the monomers.

As the solvent, an aqueous solvent is preferably used. The aqueous solvent may be water alone or a combination with water and a nonaqueous solvent. From the viewpoint of suspension stability, the solvent preferably contains a sufficient amount of water. Water is contained in an amount of, for example, 80 parts by mass or more, preferably 90 parts by mass or more, more preferably 95 parts by mass or more, especially preferably 99 parts by mass or more, based on 100 parts by mass of the aqueous solvent.

As the nonaqueous solvent, a water-soluble organic solvent is preferably used. The use of the nonaqueous solvent, particularly, a water-soluble organic solvent allows a particle size of the resulting particle to be controlled. Examples of the water-soluble organic solvent include an alcohol solvent such as methanol, ethanol, propanol, butanol, 2-methylpropyl alcohol, and 2-methyl-2-propanol; a ketone solvent such as acetone and methyl ethyl ketone; an ester solvent such as ethyl acetate; and an ether solvent such as dioxane, diethyl ether, and tetrahydrofuran.

In all the solvents, proportion of water is preferably 95% by mass or more, more preferably 98% by mass or more, even more preferably 99% by mass or more, and the upper limit thereof is 100% by mass.

An amount of the solvent is preferably 100 parts by mass or more, more preferably 120 parts by mass or more, even more preferably 135 parts by mass or more, based on 100 parts by mass of a solid. The solid indicates components in which a solvent is removed from a monomer suspension. An amount thereof is preferably 200 parts by mass or less, more preferably 160 parts by mass or less, even more preferably 150 parts by mass or less.

The addition order of a surfactant, a monomer, a polymerization initiator, an antioxidant, and a solvent is not particularly restricted. It is preferable that for example, first, a solvent and a surfactant are mixed, and a monomer, a polymerization initiator, and an antioxidant are then mixed. It is also preferable that a polymerization initiator and an antioxidant are dissolved beforehand in a monomer.

When a monomer, a polymerization initiator, an antioxidant, and optionally a solvent and a dispersion stabilizer are dispersed and suspended, an emulsion dispersing device can be used. Examples of the emulsion dispersing device include a high-speed shearing disperser of turbine type such as Milder (manufactured by Ebara Corporation) and T. K. Homo Mixer (manufactured by Primix Corporation); a high-pressure jet homogenizer such as a piston-type high-pressure homogenizer (manufactured by Gaulin Corp.) and Microfluidizer (manufactured by Microfluidics); an ultrasonic type emulsion disperser such as Ultrasonic Homogenizer (manufactured by NIHONSEIKI KAISHA LTD.); a media-agitation type disperser such as Attritor (manufactured by Mitsui Kozan); and a forcible gap passage type disperser such as Colloid Mill (manufactured by NIHONSEIKI KAISHA LTD.). Before the dispersion and suspension, preliminary agitation may be performed with a usual paddle blade or the like.

An agitation speed during the dispersion and suspension is preferably 4000 rpm or more, more preferably 5000 rpm or more, in the case of using, for example, T. K. Homogenizing Mixer MARK II model 2.5 (manufactured by Primix Corporation). Appropriate setting of the agitation time can provide a desired particle size. An agitation time is preferably in the range of 5 to 30 minutes, in the case of using the above-mentioned T. K. Homogenizing Mixer MARK II model 2.5. When the agitation time is within the above range, increase of the liquid temperature can be prevented. As a result, a polymerization reaction can be easily controlled.

A polymerization temperature is preferably in the range of 40 to 100° C., more preferably 50 to 90° C. The polymerization temperature can be appropriately adjusted depending on a type of polymerization initiator to be used. The polymerization temperature is, for example, preferably 2 to 4° C. higher than a ten-hour half-life temperature of the polymerization initiator to be used. The ten-hour half-life temperature is a measure of decomposition of a polymerization initiator. When a polymerization temperature is within the above range, the decomposition of a polymerization initiator suitably proceeds. As a result, a residual amount of a polymerization initiator in the resulting particle is reduced, and at the same time, good polymerization stability is achieved. In particular, in the case of where lauryl peroxide is used as a polymerization initiator, a polymerization temperature is preferably in the range of 64 to 66° C. since lauryl peroxide has a ten-hour half-life temperature of 62° C.

A polymerization time is preferably in the range of 5 to 600 minutes, more preferably 10 to 300 minutes. When a polymerization time is within the above range, the degree of polymerization is properly increased, so that mechanical properties of the particle can be enhanced. A polymerization atmosphere is preferably an inert atmosphere such as nitrogen atmosphere, noble gas atmosphere, or the like.

A resulting suspension of the organic polymer fine particle is cooled to a temperature of 50° C. or less, and then subjected to solid-liquid separation without substantially adding a flocculant, so that the organic polymer fine particle is collected. An amount of a flocculant is preferably 0.005 parts by mass or less, more preferably 0.001 parts by mass or less, even more preferably 0.0005 parts by mass or less, particularly preferably 0.0002 parts by mass or less, based on 100 parts by mass of the monomers used. An amount thereof is most preferably 0 parts by mass.

As a solid-liquid separation method, a suitable method can be selected from filtration, centrifugal separation, and a combination thereof.

The organic polymer fine particle thus obtained is preferably dried. A drying temperature is preferably 60° C. or more, more preferably 70° C. or more. The temperature is preferably 90° C. or less, more preferably 80° C. or less. A drying time is preferably 10 hours or more and 20 hours or less, more preferably 12 hours or more and 18 hours or less. The longer drying time is, the easier it is for a particle to dry. A shorter drying time can prevent a particle from being colored.

Further, the dried organic polymer fine particle may be disintegrated as required. The disintegration may be preferably performed at a temperature of 10 to 40° C. by preferably applying a pulverizing pressure of 0.1 to 0.5 MPa.

3. Masterbatch

As described above, the organic polymer fine particle of the present invention is useful as an additive for resin. The additive is capable of suppressing defluvium from a resin. A masterbatch which contains the organic polymer fine particle of the present invention and a resin is also within the scope of the present invention. Since the organic polymer fine particle of the present invention has a greater affinity for resin, an amount of the organic polymer fine particle relative to a resin can be increased. The organic polymer fine particle is processed into a masterbatch, so that an amount of the organic polymer fine particle in a resin composition or a resin film to be obtained can be easily adjusted. As a result, the organic polymer fine particle can be more homogeneously dispersed to prevent segregation of the organic polymer fine particle.

As a resin to be used in the masterbatch, a resin classified into a thermoplastic resin can be used. Examples of a thermoplastic resin include polyester resin; polyolefin resin; polyamide resin; polyurethane resin; (meth)acrylic resin; polycarbonate resin; polystyrene resin. Among the examples, polyolefin resin is preferable. As the polyolefin resin, polyethylene, polypropylene, poly(4-methylpentene) or the like may be used. Among the examples, polypropylene is preferable. The polypropylene resin mainly includes a homopolymer consisting only of polypropylene and a random polymer in which polypropylene and a small amount of ethylene are copolymerized. The polypropylene is preferably 95% by mass or more and the ethylene is preferably 5% by mass or less in the random polymer. The term "polypropylene resin" used in the present invention refers to the two kinds or general propylene resins which are copolymerized with other propylene polymers to improve the physical properties. A polypropylene resin in which the proportion of a unit derived from propylene is preferably 90% by mass or more, more preferably 95% by mass or more.

An amount of a resin in the masterbatch is preferably 50% by mass or more, more preferably 70% by mass or more, even more preferably 80% by mass or more, particularly preferably 85% by mass or more. An amount thereof is preferably 99% by mass or less, more preferably 95% by mass or less.

The content of the organic polymer fine particle in the masterbatch is preferably 0.1 parts by mass or more, more preferably 1 part by mass or more, even more preferably 5 parts by mass or more, based on 100 parts by mass of a resin in the masterbatch. The content thereof is preferably 100 parts by mass or less, more preferably 50 parts by mass or less, even more preferably 20 parts by mass or less, still more preferably 15 parts by mass or less.

The masterbatch of the present invention preferably further contains an antioxidant. An antioxidant can be selected from the above exemplified range, and a hindered phenol antioxidant and a phosphorus antioxidant are preferable. In particular, the total of a hindered phenol antioxidant and a phosphorus antioxidant is preferably 80% by mass or more, more preferably 90% by mass or more, even more preferably 95% by mass or more, particularly preferably 98% by mass or more, in an antioxidant.

A hindered phenol antioxidant is contained in an amount of preferably 20 to 80% by mass, more preferably 30 to 70% by mass, even more preferably 40 to 60% by mass, in an antioxidant.

An amount of an antioxidant is preferably 0.1 parts by mass or more, preferably 0.5 parts by mass or more, even more preferably 0.8 parts by mass or more, based on 100 parts by mass of a resin in the masterbatch. An amount thereof is preferably 7 parts by mass or less, more preferably 4 parts by mass or less, even more preferably 2 parts by mass or less, particularly preferably 1.5 parts by mass or less.

As a method for preparation the masterbatch, a method of adding and mixing the polymer particles in a polymerization stage for synthesis of the resin; a method of melting and mixing a polymerized resin using an extruder or the like; or a method of adding and mixing the polymer particle in a state where the resin is dissolved in a solvent may be used. Among the examples, a method of melting and adding is preferable since a resin composition containing the organic polymer fine particles dispersed at a high concentration is easily prepared by the method.

The produced masterbatch is usually prepared into a powder form or a pellet form.

4. Fine Particle-Containing Resin Film and Resin Composition

A resin film containing the organic polymer fine particle of the present invention and a resin is also included in the scope of the present invention. The film is hereinafter referred to as "fine particle-containing resin film" in some cases. The organic polymer fine particle of the present invention is suppressed hydrophilization and an Al content reduced in the organic polymer fine particle. As a result, the fine particle-containing resin film in which defluvium of the organic polymer fine particles is suppressed during production of the film or after rubbing of the film can be produced by using the organic polymer fine particle.

A resin used in the fine particle-containing resin film can be selected from the range exemplified as the resin used in the masterbatch. The resin used in the fine particle-containing resin film is hereinafter referred to as "matrix resin" as well. In the case of producing the resin film after processing into a masterbatch, the matrix resin may be either a same as or different from a resin used in the masterbatch.

An amount of the organic polymer fine particle contained in the fine particle-containing resin film is preferably 0.01% by mass or more, more preferably 0.05% by mass or more, even more preferably 0.1% by mass or more. An amount thereof is preferably 10% by mass or less, more preferably 5% by mass or less, even more preferably 2% by mass or less, particularly preferably 1% by mass or less.

The organic polymer fine particle of the present invention is capable of suppressing defluvium from the fine particle-containing resin film during molding of the fine particle-containing resin film. The defluvium of the particle from the fine particle-containing resin film can be evaluated by the following defluvium rate.

$$\text{defluvium rate} = \text{number of defluvium of particle}/(\text{number of particles} + \text{number of defluvium of particle})$$

The number of defluvium of particle is a value obtained by counting the number of defluvium particle traces contained in an area of 270 μm×200 μm in the scanning electron micrograph image at 500× magnification, and averaging the counted numbers of the defluvium particle traces for 25 areas. The number of particles is a value obtained by counting the number of protrusions derived from the organic polymer fine particle contained in a same area as where the number of defluvium particle traces is determined, and similarly averaging the counted numbers of the particles for 25 areas.

A defluvium particle trace of and a protrusion derived from the organic polymer fine particles can be identified as shown in FIG. 1.

The rate of defluvium from the fine particle-containing resin film immediately after molding is preferably 3% or less, more preferably 2.5% or less, even more preferably 1.5% or less.

The use of the organic polymer fine particle of the present invention can suppress defluvium of the particle from the fine particle-containing resin film even after the fine particle-containing resin film is rubbed. For example, the defluvium rate after the following friction test is preferably 10% or less, more preferably 8% or less, even more preferably 6% or less.

[Friction Test]

A fine particle-containing resin film is fixed to a 200 g-weight having a bottom width of 63.5 mm and a bottom length of 63.5 mm. The weight with the fixed fine particle-containing resin film is placed on a measurement base where the fine particle-containing resin film is fixed to the upper so that these fine particle-containing resin films are in contact with each other. Thereafter, the weight is slid in the one direction at a rate of 150 mm/min. An area where the weight is slid 20 times is determined as a measuring area.

It should be noted that there is a difference in the degree of crystal growth between both surfaces of the fine particle-containing resin film. When the smoothness is different, a smoother surface having less crystal growth is used in the friction test.

The coefficient of static friction $\mu_s$ of the fine particle-containing resin film is preferably 0.5 or less, more preferably 0.3 or less, even more preferably 0.2 or less. The coefficient thereof is, for example, preferably 0.01 or more.

The coefficient of dynamic friction $\mu_k$ of the fine particle-containing resin film is preferably 0.3 or less, more preferably 0.2 or less, even more preferably 0.15 or less. The coefficient thereof is, for example, preferably 0.01 or more.

The fine particle-containing resin film has a thickness of preferably 0.1 μm or more, more preferably 0.5 μm or more, even more preferably 0.7 μm or more, still more preferably 1 μm or more. It also has a thickness of preferably 1 mm or less, more preferably 500 μm or less, even more preferably 400 μm or less.

A ratio of the mass average particle size of the organic polymer fine particle to a thickness of the fine particle-containing resin film, i.e. organic polymer fine particle size/thickness of fine particle-containing resin film, is preferably 1.5 or more, more preferably 2 or more, even more preferably 2.5 or more. The ratio thereof is preferably 10 or less, more preferably 7 or less, even more preferably 5.5 or less.

The fine particle-containing resin film may be further laminated with a base film. A laminated film containing at least one layer of the fine particle-containing resin film and a base film is also included in the scope of the present invention. Preferably at least one layer of the fine particle-containing resin film is, more preferably two layers thereof are laminated on the base film. The resin film may be laminated on both sides or one side of the base film, preferably laminated on both sides. In the case where the fine particle-containing resin film and the base film are laminated, the fine particle-containing resin film is hereinafter referred to as "fine particle added skin layer" and the base film is referred to as "core layer" in some cases.

A resin used in the core layer is selected from the range exemplified as a resin used in the masterbatch. The resin used in the core layer may be either a same as or different from a resin used in the fine particle-containing resin film, preferably is the same. The organic polymer fine particle may or may not be contained in the core layer.

In the laminated film, a ratio of a thickness of the core layer to a thickness of the fine particle added skin layer, i.e. thickness of core layer/thickness of fine particle added skin layer, is preferably 2 or more, more preferably 10 or more, even more preferably 15 or more. The ratio thereof is preferably 50 or less, more preferably 30 or less, even more preferably 20 or less.

The organic polymer fine particle contained in the laminated film is in an amount of preferably 0.01% by mass or more, more preferably 0.1% by mass or more, even more preferably 0.2% by mass or more. The organic polymer fine particles contained in the laminated film is in an amount of preferably 5% by mass or less, more preferably 2% by mass or less, even more preferably 1% by mass or less.

The laminated film in which the fine particle added skin layer and the core layer are laminated has a thickness of preferably 5 μm or more, more preferably 10 μm or more, even more preferably 15 μm or more. It has a thickness of preferably 1 mm or less, more preferably 500 μm or less, even more preferably 400 μm or less.

When the fine particle-containing resin film is produced, the organic polymer fine particle is directly or after processed into the above-mentioned masterbatch, mixed with a resin at the above-mentioned proportion. Thereby a resin composition is produced. The organic polymer fine particle is preferably melted and mixed. The resin composition is molded to produce a fine particle-containing resin film. In the molding, the resin composition is preferably melt extruded, and further preferably stretched. Such melt extrusion can produce an unstretched film, i.e. cast film, and the cast film is stretched to produce a stretched film.

A resin composition to produce the fine particle-containing resin film is also included in the scope of the present invention. The masterbatch, which contains the organic polymer fine particle at a high concentration, is mixed with a resin and then diluted. As a result, the resin composition having an intended concentration of the organic polymer fine particle is produced. The resin used for dilution may be either a same as or different from the resin used in the masterbatch. In particular, from the viewpoints of productivity and processability, the resin is preferably a polyolefin resin, more preferably a polypropylene resin, even more preferably a polypropylene resin in which an unit derived from propylene is preferably 90% by mass or more, more preferably 95% by mass or more, particularly preferably a homopolymer consisting only of polypropylene. The use of the masterbatch can produce a resin composition having good dispersity of the organic polymer fine particle.

In the case of using the masterbatch, the resin used for dilution is in an amount of preferably 2 parts by mass or more and 200 parts by mass or less, more preferably 3 parts by mass or more and 150 parts by mass or less, even more preferably 5 parts by mass or more and 100 parts by mass or less, based on 1 part by mass of the masterbatch.

As a method of mixing the organic polymer fine particle with a resin and molding the resin composition, melt extrusion molding method such as a T-die method is preferable. In the case where the fine particle-containing resin film and a base film is laminated to produce a laminated film, co-extrusion may be performed. When the co-extrusion is performed, a melting temperature is in the range of preferably 180 to 240° C., more preferably 200 to 220° C.

A cast film has a thickness of, for example, preferably 1 μm or more and 1 mm or less. An unstretched fine particle-containing resin film has a thickness of preferably 1 μm or more and 900 μm or less, more preferably 10 μm or more and 700 μm or less, even more preferably 15 μm or more and 500 μm or less.

When the fine particle-containing resin film and the base film are laminated, an unstretched laminated film contains these layers has a thickness of, for example, preferably 100 μm or more and 1 mm or less, more preferably 200 μm or more and 500 μm or less, even more preferably 250 μm or more and 400 μm or less.

A stretching axis of a cast film may be uniaxial or biaxial, preferably biaxial. In the case of biaxial stretching, sequential biaxial stretching or simultaneous biaxial stretching may be performed. A stretch ratio is preferably 1 to 5 times, more preferably 2 to 4 times in both a vertical and horizontal axes.

The fine particle-containing resin film after stretching has a thickness of, for example, preferably 0.1 μm or more, more preferably 0.5 μm or more, even more preferably 0.7 μm or more. It has a thickness of preferably 50 μm or less, more preferably 20 μm or less, even more preferably 10 μm or less, still more preferably 5 μm or less, particularly preferably 3 μm or less.

When the fine particle-containing resin film and the base film are laminated, a stretched laminated film contains these layers has a thickness of preferably 5 µm or more, more preferably 10 µm or more, even more preferably 15 µm or more. It has a thickness of preferably 100 µm or less, more preferably 50 µm or less, even more preferably 30 µm or less.

The organic polymer fine particle of the present invention is capable of suppressing defluvium from a film. Therefore, the organic polymer fine particle is useful as an antiblocking agent for a resin film. The resin film containing the organic polymer fine particle of the present invention is suitably used as general packaging materials, food packaging materials such as food packaging film, and pharmaceutical packaging materials such as pharmaceutical packaging film.

The present application claims the benefit of the priority date of Japanese patent application No. 2015-114273 filed on Jun. 4, 2015 and Japanese patent application No. 2016-071143 filed on Mar. 31, 2015. All of the contents of the above patent applications are incorporated by reference herein.

EXAMPLES

Hereinafter, the present invention is described in more detail with Examples. The present invention is, however, not restricted to the following Examples in any way, and it is possible to work the present invention according to the Examples with an additional appropriate change within the range of the above descriptions and the following descriptions. Such a changed embodiment is also included in the technical scope of the present invention. The following "part" is "part by mass" and "%" is "mass %" unless otherwise noted.

Various measurements and evaluations were carried out according to the following methods.

Al Content

Al was quantitatively measured by inductively coupled plasma (ICP) emission spectral analysis method.

In a platinum crucible, 0.5 g±0.05 g of organic polymer fine particles to be measured was put, heated and carbonized on a hot plate. The platinum crucible which contained the carbonized particle was put in a magnetic crucible, and the carbonized particle was subjected to asking by raising a temperature to 700° C. in an electric furnace. Nitric acid was added to the platinum crucible taken out from the electric furnace. The residue was dissolved while heating, and then diluted to 20 ml in total with ultrapure water. As for a blank, an empty platinum crucible was subjected to the same procedure. A sample solution was appropriately diluted, and Al was quantitatively measured with an inductively coupled plasma emission spectrometer: iCAP 6500 DUO (manufactured by Thermo Fisher Scientific).

The quantitation limit of Al by the above apparatus was 2.67 ppb and the Al amount of the blank was 15 ppb.

Sulfur Atom Content

Sulfur atom was quantitatively measured by inductively coupled plasma (ICP) emission spectral analysis method.

In a platinum crucible, 0.5 g±0.05 g of organic polymer fine particles to be measured was put, heated and carbonized on a hot plate. The platinum crucible which contained the carbonized particle was put in a magnetic crucible, and the carbonized particle was subjected to asking by raising the temperature to 700° C. in an electric furnace. Nitric acid was added to the platinum crucible taken out from the electric furnace. The residue was dissolved while heating, and then diluted to 20 ml in total with ultrapure water. As for a blank, an empty platinum crucible was subjected to the same procedure. A sample solution was appropriately diluted, and S was quantitatively measured with an inductively coupled plasma emission spectrometer: iCAP 6500 DUO (manufactured by Thermo Fisher Scientific).

The quantitation limit of sulfur by the above apparatus was 4.05 ppb and the sulfur amount of the blank was 30 ppb.

Average Particle Size and Coefficient of Variation

Into 0.5 g of a surfactant ("NEOPELEX (registered trademark) G-15", sodium dodecylbenzene sulfonate, manufactured by Kao Corp.), 0.1 g of organic polymer fine particles were dispersed. Then, 15 g of deionized water was added to the obtained dispersed viscous liquid. Thereafter, ultrasonic wave was applied to the mixture to prepare an organic polymer fine particle dispersion in a particle dispersed state. Using a precision grain size distribution measuring device ("Coulter Multisizer III" manufactured by Beckman Coulter, Inc., at an aperture of 50 µm), particle sizes of 30,000 particles were measured, and an average particle size on a mass basis and a coefficient of variation of the particle size were determined.

$$\text{Coefficient of variation of particle size (\%)} = (\sigma/d) \times 100$$

The "σ" represents a standard deviation of the particle size, and the "d" represents an average particle size on a mass basis.

Thermal Decomposition Start Temperature

A thermal decomposition start temperature of the organic polymer fine particle was measured using a thermal analyzer (DTG-50M, manufactured by Shimadzu Corporation) under conditions of a sample amount of 15 mg, a temperature rising rate of 10° C./min (a highest temperature: 500° C.), in air, and a flow rate of 20 mL/min. First, using a precision balance, 15 mg of a sample was weighed in a defined aluminum cup. The aluminum cup was set to a prescribed position in the thermal analyzer, and a flow rate of air was adjusted to a defined flow rate, i.e. 20 mL/min. After the analyzer was stabilized, temperature rise was started. An intersection between an extension line of the base line (horizontal line portion) of the TG curve obtained at this time and a tangent of the mass reduction portion (line sloping downward to the right) was determined as a thermal decomposition start temperature of the organic polymer fine particle.

Hydrophobicity Test

A glass container having a cross-sectional area of 5 cm$^2$ or more and 10 cm$^2$ or less was prepared, then filled with 20 mL deionized water having a liquid temperature of 20° C. that was adjusted using a constant temperature bath. A time after 0.02±0.005 g of organic polymer fine particles were gently floated on a water surface before the first particle started to precipitate was determined as a precipitation start time.

Measurement of Moisture Content

The moisture content of the particle was measured with an automatic moisture meter by Karl Fischer volumetric titration method KF-07 model (manufactured by Mitsubishi Chemical Corporation). As a titrant, AQUAMICRON SS-Z 3 mg (manufactured by Mitsubishi Chemical Corp.) was used, and the titer was determined using deionized water. Using the titrant, about 0.1 g of dried pulverized particles fully pulverized were measured while dispersed in a methanol liquid.

The dried pulverized particle to be measured were prepared by pulverizing organic polymer fine particles having a moisture content of 1% or less at a pulverization pressure of 0.3 MPa at room temperature using SuperJet Mill SJ-500 (manufactured by Nissin Engineering Inc.). The average particle size on a mass basis of the resulting dried pulverized particle was within ±0.2 µm of the measurement value of the organic polymer fine particle in the polymeric liquid after completion of the polymerization, and the coefficient of variation was within ±2.5% of the organic polymer fine particles in the polymeric liquid.

Measurement of Coefficient of Friction (COF)

The coefficient of friction was measured using a biaxially stretched film (BOPP) obtained in Examples 1 to 6 and Comparative Examples 1 to 4. When the cast film was prepared by winding up the molded film from the T-die extrusion molding machine (manufactured by Soken), a cooling rate on a side which was brought into contact with a winding roll was different from that on the other side. The other side was called an air face. The crystal growth in the roll face side was suppressed because of the higher cooling rate. For this reason, the completed cast film had a smooth roll face side and a rough air face side on which a significant crystal growth was observed. In the measurement of the coefficient of friction (COF), the roll face side was a measuring object.

As a friction coefficient measurement device, Autograph AG-X manufactured by Shimadzu Corporation was used. As jigs for measuring the coefficient of friction, a load cell having a capacity of 50 N, a specialized measurement base (200 mm in width×355 mm in length), and a moving weight (size: 63.5 mm in width×63.5 mm in length×6.4 mm in thickness, mass of 200 g) were used.

The device was used to measure a 12 cm×12 cm area and a 12 cm×18 cm area in the film center portion. For the measurement, a 12 cm×18 cm sheet of sample and a 12 cm×12 cm sheet of sample were cut from the film center portion. Then, the 12 cm×18 cm sheet of sample was fixed to the measurement base with the roll face side, which is a surface for measuring friction resistance, facing upward, and four corners of the sample were secured with cellophane tape. The moving weight was wrapped with the 12 cm×12 cm sheet of sample so that the roll face side comes outward and fixed with cellophane tape.

The moving weight wrapped with the sample was connected with a crosshead and slid at a rate of 150 mm/min on the film attached on the measurement base to measure the travel resistance, so that the following coefficient of static friction and coefficient of dynamic friction were determined.

Coefficient of static friction ($\mu_s$)=maximum tensile test force at the start of moving weight/(mass of moving weight×acceleration of gravity)

Coefficient of dynamic friction ($\mu_k$)=average tensile test force during travel of moving weight/(mass of moving weight×acceleration of gravity)

The travel distance was 100 mm and the distance to determine the coefficient of dynamic friction was in the range of 30 mm to 90 mm from the travel start point.

The measurement of the coefficient of friction was performed continuously 20 times, and an average of the coefficient of friction was determined from the measured values at the first 4 times.

The film used 20 times for measuring the travel resistance was determined as a film sample subjected to the friction test for counting the following defluvium number.

Counting of the Number of Defluvium in SEM Measurement

The surface of the obtained film sample subjected to the friction test and the surface of a film sample not subjected to the friction test were observed at secondary electron image using an SEM, i.e. scanning electron microscope, VK-8500 (manufactured by Keyence Corporation) at an acceleration voltage of 5 kV.

In each of the film samples, 25 images of a 270 µm×200 µm area were taken at a 500 times magnified view. The number of particles, i.e. the number of protrusions derived from the organic polymer fine particle, and the number of defluvium, i.e. defluvium trace, contained in the photographed images were individually counted, and the number of defluvium was determined in accordance with the following formula. The defluvium rate before the friction test (during stretching) was determined from the number of defluvium of particle and the number of particles in the film sample not subjected to the friction test. The defluvium rate after the friction test was determined from the number of defluvium of particle and the number of particles in the film sample subjected to the friction test.

Defluvium rate (%)=number of defluvium of particle/(number of particles+number of defluvium of particle)

In the SEM images, it is possible to obviously observe the defluvium particle trace as shown in FIG. 1, so that the number of defluvium of particle can be easily counted.

Quantification of Hindered Phenol Antioxidant (IRGANOX® 1010)

IRGANOX® 1010 was quantified using a high-performance liquid chromatography (HPLC). The measurement conditions are as follows.

Column: manufactured by Shiseido Company, Ltd., CAPCELL PAK C18 TYPE MG 5 µm, size 4.6 mm I.D.×250 mm Column temperature: 40° C.

Eluent: methanol/acetonitrile=50/50

Detector: UV 280 nm

Flow rate: 1 mL/min

The adjustment of the sample, measurement of the sample, and calculation of the antioxidant concentration are as follows.

(1) Adjustment of Sample

IRGANOX® 1010 standard sample

An acetonitrile solution of IRGANOX® 1010 (manufactured by Ciba Specialty Chemicals Inc.) was prepared. Several samples were produced in the solution at a concentration of about 10 to 100 ppm.

Organic polymer fine particle sample

One gram of the organic polymer fine particles were dispersed in 10 mL chloroform and agitated for a day at room temperature. The agitated dispersion was filtered with a filter having a pore size of 0.45 µm or less to collect a filtrate. The filtrate was concentrated, and diluted with acetonitrile to give a sample solution.

(2) Measurement of Sample

The IRGANOX® 1010 standard sample and the organic polymer fine particle sample were measured at room temperature. The peak position of the IRGANOX® 1010 standard sample was about 8.4 to 8.5 min. Based on the measurement result, a calibration curve was prepared. Using the calibration curve, IRGANOX® 1010 contained in the organic polymer fine particle sample was quantified.

Example 1

Preparation of Organic Polymer Fine Particle

A flask equipped with an agitator, an inert gas inlet tube, a reflux condenser and a thermometer was charged with 523 parts of deionized water in which 3.6 parts of a polyoxyethylene distyryl phenyl ether sulfate ammonium salt (trade name "HITENOL (registered trademark) NF-08", manufactured by Dai-ichi Kogyo Seiyaku Co., Ltd.) had been dissolved. The flask was then charged with 252 parts of methyl methacrylate (MMA) as a monomer, 108 parts of ethylene glycol dimethacrylate (EGDMA), 3.6 parts, i.e. 1% by mass relative to the mass of the monomer, of lauroyl peroxide (LPO) as a polymerization initiator, and 1.8 parts, i.e. 0.5% by mass relative to the monomer, of a hindered phenol antioxidant (manufactured by BASF Japan, trade name "IRGANOX® 1010", pentaerythritol tetrakis[3-(3,5-di-tert-butyl-4-hydroxyphenyl)propionate]) as an antioxidant, which were prepared in advance. The charged mixture was agitated at 5000 rpm for 10 minutes using a T. K. Homo Mixer (manufactured by Primix Corporation), to give a homogeneous suspension.

Into the suspension, 900 parts of deionized water was added. The mixture was then heated to 65° C. while nitrogen gas was blown into the mixture. A reaction container was kept at 65° C., and the reaction start time was determined at a time when the liquid temperature reached 75° C. by self-heating. After the reaction started, the mixture was agitated at 75° C. for 1.5 hour, and then, the polymeric liquid was further heated to 85° C. The polymeric liquid agitated for 2 hours to complete the polymerization reaction. Thereafter, the reaction solution was cooled to 50° C. or lower and then filtered to take out a polymerization product. Using a hot air dryer (manufactured by Yamato Scientific Co., Ltd.), the polymerization product was dried at 80° C. for 15 hours or more to obtain organic polymer fine particle. The moisture content of the organic polymer fine particle was 1% or less.

Since the dried organic polymer fine particles thus obtained were flocculated due to drying, the agglomerate was pulverized under a pulverization pressure of 0.3 MPa at room temperature using SuperJet Mill SJ-500 (manufactured by Nissin Engineering Inc.). Thus, organic polymer fine particle free from flocculation was produced.

Preparation of Film

Further, 10 parts of the organic polymer fine particles thus produced, 90 parts of pellets of polypropylene (NOVATEC (registered trademark) FY4 manufactured by Japan Polypropylene Corporation), and 0.5 parts of IRGANOX® 1010 and 0.5 parts of IRGAFOS® 168 as antioxidants were mixed using a same-direction rotating biaxial extruder ((HK-25D) manufactured by Parker Corporation). The mixture was melted and kneaded at 212° C. and then cooled with water to give a strand. The strand was appropriately cut to prepare a polypropylene masterbatch including 10% of organic polymer fine particle.

Using the polypropylene masterbatch thus obtained and the pellet of polypropylene, three-layered cast film composed of two kind of materials was prepared. A constitution in which a fine particle added skin layer was laminated on both sides of a core layer was adopted. A T-die extrusion molding machine (manufactured by Soken) was used for the film preparation. In the two fine particle added skin layers, 1 part of the masterbatch including 10% of organic polymer fine particle and 9 parts of the pellet of polypropylene were used. In the core layer, 180 parts of pellet of polypropylene alone were used. As for the thickness of the cast film, each of the fine particle added skin layers had a thickness of 16 μm, and the core layer had a thickness of 288 μm, so that the cast film having a total thickness of 320 μm was obtained.

The cast film thus obtained was cut into a piece having a length of 9 cm and width of 9 cm. The cut film piece was subjected to simultaneous biaxial stretching under heating conditions of 165° C. with the stretch ratio set to 3 times in longitudinal and lateral directions using a simultaneous biaxial stretching machine (manufactured by Toyo Seiki Seisaku-sho, Ltd.). The obtained film had a size of 22 cm×22 cm. The center portion of the stretched film had an average thickness of 20 μm, while the film end portion had a thickness of 100 μm or so, and a 12 cm×12-18 cm portion in the center of the film had a thickness of about 20 μm.

The film molded by the T-die extrusion molding machine (manufactured by Soken) was wound up when the cast film was prepared. Aside to be in contact with a winding roll is called a roll face, and the other side is called an air face. In general, crystal growth can be suppressed on the roll face side because of high cooling speed, so that the completed roll face side is smooth. On the other hand, significant crystal growth is observed on the air face side, so that the air face side obtains a rough surface as compared with the roll face side.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Examples 2 to 6

Organic polymer fine particles were produced in the same manner as in Example 1, except that the composition of the monomer and the amount of the polymerization initiator were changed as listed in Table 1. The moisture content of the dried organic polymer fine particles was 1% or less in any of the Examples. In addition, a films were produced in the same manner as in Example 1.

With respect to the obtained organic polymer fine particles, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

The Al content of the organic polymer fine particle obtained in Example 3 was measured to be less than 30 ppb.

Example 7

An organic polymer fine particle was produced while the composition of the monomer and the amount of the polymerization initiator were the same as in Example 2. The moisture content of the dried organic polymer fine particle was 1% or less. Since the dried organic polymer fine particles thus obtained were flocculated due to drying, the agglomerate was pulverized under a pulverization pressure of 0.3 MPa at room temperature using SuperJet Mill SJ-500 (manufactured by Nissin Engineering Inc.). Thus, organic polymer fine particle free from flocculation was produced. The obtained fine particle was classified using a classifier TC-15 (manufactured by Nissin Engineering Inc.) to remove microparticle mainly having a size of 1 μm or less.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Example 8

An organic polymer fine particle was produced in the same manner as in Example 2, except that the amount of the polymerization initiator was changed to 7.2 parts.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Example 9

An organic polymer fine particle was produced in the same manner as in Example 2, except that as the polymerization initiator, 3.6 parts of PERHEXL® O (t-hexyl peroxy-2-ethylhexanoate, manufactured by NOF Corporation) was added to be used.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Example 10

An organic polymer fine particle was produced in the same manner as in Example 2, except that as the polymerization initiator, 3.6 parts of PERHEXA® HC (1,1-di(t-hexylperoxy)cyclohexane, manufactured by NOF Corporation) was added to be used.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Example 11

An organic polymer fine particles was produced in the same manner as in Example 2, except that as the bifunctional crosslinkable monomer, 1,4-butanediol dimethacrylate was used, and the amount of the polymerization initiator was changed to 7.2 parts.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Example 12

An organic polymer fine particle was produced in the same manner as in Example 3, except that the antioxidant was not added. The moisture content of the dried organic polymer fine particle was 1% or less. Since the dried organic polymer fine particles thus obtained were flocculated due to drying, the agglomerate was pulverized under a pulverization pressure of 0.3 MPa at room temperature using SuperJet Mill SJ-500 (manufactured by Nissin Engineering Inc.). Thus, organic polymer fine particle free from flocculation was produced.

Based on 100 parts by mass of the organic polymer fine particles, 0.5 parts of a hindered phenol antioxidant, IRGANOX® 1010, was added. The organic polymer fine particles and the hindered phenol antioxidant were mixed in a mortar to produce antioxidant-added organic polymer fine particles.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Comparative Examples 1, 2 and 3

The polymerization reaction was completed in the same manner as in Example 1, except that the composition of the monomer was changed as listed in Table 1. Thereafter, the reaction solution was cooled from 70° C. to 80° C., 25 parts of 0.6% aluminum sulfate aqueous solution was added. The mixture was agitated for 30 minutes or more. Subsequently, the reaction solution obtained by cooling to 50° C. or lower was filtered to take out a polymerization product. Using a hot air dryer (manufactured by Yamato Scientific Co., Ltd.), the polymerization product was dried at 80° C. for 15 hours or more to produce organic polymer fine particle.

Since the dried organic polymer fine particles thus obtained were flocculated due to drying, the agglomerate was pulverized under a pulverization pressure of 0.3 MPa at room temperature using SuperJet Mill SJ-500 (manufactured by Nissin Engineering Inc.). Thus, organic polymer fine particle free from flocculation was produced. In addition, a film was produced in the same manner as in Example 1.

When the Al content of the obtained organic polymer fine particle was measured, the organic polymer fine particle in Comparative Example 2 had an Al content of 42.3 ppm, and the organic polymer fine particle in Comparative Example 3 had an Al content of 32.8 ppm.

With respect to the obtained organic polymer fine particles, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Comparative Example 4

An organic polymer fine particle was produced in the same manner as in Example 2, except that 1.44 parts of AO-412S (trade name) 2,2-Bis{[3-(dodecylthio)-1-oxopropoxy]methyl}propane-1,3-diyl bis[3-(dodecylthio)propionate] (manufactured by ADEKA Corporation) and 0.36 parts of IRGANOX® 1010 were used as the antioxidant.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), sulfur atom content, and defluvium rate from the film before and after the friction test are shown in Table 2.

Comparative Example 5

An organic polymer fine particle was produced in the same manner as in Example 1, except that the composition of the monomer was changed to 356.4 parts of MMA and 3.6 parts of EGDMA.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

Comparative Example 6

An organic polymer fine particle was produced in the same manner as in Example 3, except that the hindered phenol antioxidant was not added.

With respect to the obtained organic polymer fine particle, the average particle size, coefficient of variation, ratio of the average particle size (Dn/Dw), precipitation start time, thermal decomposition start temperature, coefficient of friction of the film ($\mu_s$, $\mu_k$), and defluvium rate from the film before and after the friction test are shown in Table 2.

TABLE 1

| | | | Composition (upper row: part by mass, lower row: rate based on 100 parts by mass of the total monomers (%)) | | | | | | | | | | | |
|---|---|---|---|---|---|---|---|---|---|---|---|---|---|---|
| | | | Example | | | | | | | | | | | |
| | | | 1 | 2 | 3 | 4 | 5 | 6 | 7 | 8 | 9 | 10 | 11 |
| Monomer | MMA | part | 252 | 288 | 324 | 324 | 324 | 288 | 288 | 288 | 288 | 288 | 288 |
| | | % | 70 | 80 | 90 | 90 | 90 | 80 | 80 | 80 | 80 | 80 | 80 |
| | EGDMA | part | 108 | 72 | 36 | | | 72 | 72 | 72 | 72 | 72 | |
| | | % | 30 | 20 | 10 | | | 20 | 20 | 20 | 20 | 20 | |
| | 1.6HX | part | | | | 36 | | | | | | | |
| | | % | | | | 10 | | | | | | | |
| | 3EG | part | | | | | 36 | | | | | | |
| | | % | | | | | 10 | | | | | | |
| | 1.4BGDMA | part | | | | | | | | | | | 72 |
| | | % | | | | | | | | | | | 20 |
| | TMPTMA | part | | | | | | | | | | | |
| | | % | | | | | | | | | | | |
| Initiator | LPO | part | 3.6 | 3.6 | 3.6 | 3.6 | 3.6 | 1.8 | 3.6 | 7.2 | 3.6 | 3.6 | 7.2 |
| | | % | 1.0 | 1.0 | 1.0 | 1.0 | 1.0 | 0.5 | 1.0 | 2.0 | 1.0 | 1.0 | 2.0 |
| | PERHEXL ® O | part | | | | | | | | | 3.6 | | |
| | | % | | | | | | | | | 1.0 | | |
| | PERHEXA ® HC | part | | | | | | | | | | 3.6 | |
| | | % | | | | | | | | | | 1.0 | |
| Antioxidant | IRGANOX ® 1010 | part | 1.8 | 1.8 | 1.8 | 1.8 | 1.8 | 1.8 | 1.8 | 1.8 | 1.8 | 1.8 | 1.8 |
| | | % | 0.50 | 0.50 | 0.50 | 0.50 | 0.50 | 0.50 | 0.50 | 0.50 | 0.50 | 0.50 | 0.50 |
| | AO-412S (trade name) | part | | | | | | | | | | | |
| | | % | | | | | | | | | | | |
| Hindered phenol antioxidant/ Polymerization initiator | | | 0.50 | 0.50 | 0.50 | 0.50 | 0.50 | 1.00 | 0.50 | 0.25 | 0.50 | 0.50 | 0.25 |
| Flocculant | 0.6% aluminum sulfate aqueous solution | part | | | | | | | | | | | |

| | | | | Example | Comparative Example | | | | | |
|---|---|---|---|---|---|---|---|---|---|---|
| | | | | 12 | 1 | 2 | 3 | 4 | 5 | 6 |
| Monomer | MMA | | part | 324 | 288 | 324 | 324 | 288 | 356.4 | 324 |
| | | | % | 90 | 80 | 90 | 90 | 80 | 99 | 90 |
| | EGDMA | | part | 36 | 72 | | 36 | 72 | 3.6 | 36 |
| | | | % | 10 | 20 | | 10 | 20 | 1 | 10 |
| | 1.6HX | | part | | | | | | | |
| | | | % | | | | | | | |
| | 3EG | | part | | | | | | | |
| | | | % | | | | | | | |
| | 1.4BGDMA | | part | | | | | | | |
| | | | % | | | | | | | |
| | TMPTMA | | part | | | | 36 | | | |
| | | | % | | | | 10 | | | |
| Initiator | LPO | | part | 3.6 | 10.8 | 3.6 | 3.6 | 3.6 | 3.6 | 3.6 |
| | | | % | 1.0 | 3.0 | 1.0 | 1.0 | 1.0 | 1.0 | 1.0 |
| | PERHEXL ® O | | part | | | | | | | |
| | | | % | | | | | | | |
| | PERHEXA ® HC | | part | | | | | | | |
| | | | % | | | | | | | |
| Antioxidant | IRGANOX ® 1010 | | part | 1.8* | 1.8 | 1.8 | 1.8 | 0.36 | 1.8 | |
| | | | % | 0.50 | 0.50 | 0.50 | 0.50 | 0.10 | 0.50 | |
| | AO-412S (trade name) | | part | | | | | 1.44 | | |
| | | | % | | | | | 0.40 | | |
| Hindered phenol antioxidant/ Polymerization initiator | | | | 0.50 | 0.17 | 0.50 | 0.50 | 0.10 | 0.50 | |
| Flocculant | 0.6% aluminum sulfate aqueous solution | | part | | | 25 | | 25 | | |

*In Example 12, the organic polymer fine particle was produced without adding a antioxidant, dried, pulverized, and then added the antioxidant, IRGANOX ® 1010.

In Tables, "MMA" stands for methyl methacrylate,
"EGDMA" stands for ethylene glycol dimethacrylate,
"1.6HX" stands for 1,6-hexanediol dimethacrylate,
"3EG" stands for triethylene glycol dimethacrylate,
"1.4BGDMA" stands for 1,4-butanediol dimethacrylate,
"TMPTMA" stands for trimethylolpropane trimethacrylate,
"LPO" stands for lauroyl peroxide,
"PERHEXL® O" is t-hexyl peroxy-2-ethylhexanoate,
"PERHEXA® HC" is 1,1-di(t-hexylperoxy)cyclohexane,
"IRGANOX® 1010" is pentaerythritol tetrakis[3-(3,5-di-tert-butyl-4-hydroxyphenyl)propionate], and
"AO-412S (trade name)" is 2,2-bis{[3-(dodecylthio)-1-oxopropoxy]methyl}propane-1,3-diyl bis[3-(dodecylthio)propionate].

TABLE 2

|  |  |  | Example |  |  |  |  |  |  |  |  |  |  |  |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
| Particle shape | Mass average particle size | μm | 4.3 | 4.5 | 4.5 | 4.5 | 4.5 | 4.5 | 4.5 | 4.6 | 4.6 | 4.5 | 4.5 | 4.5 |
|  | Coefficient of variation | % | 37.1 | 36.5 | 38.1 | 36.2 | 36.2 | 36.7 | 35 | 37.7 | 37.5 | 37.7 | 39 | 38.1 |
|  | Number average particle size | μm | 1.98 | 2.03 | 2.1 | 1.95 | 2.12 | 2.3 | 3.2 | 2.2 | 2.1 | 1.99 | 2.03 | 2.1 |
|  | Dn/Dw |  | 0.46 | 0.45 | 0.47 | 0.43 | 0.47 | 0.51 | 0.71 | 0.48 | 0.46 | 0.44 | 0.45 | 0.47 |
| Antioxidant | IRGANOX® 1010 content | % | 0.38 | 0.40 | 0.46 | 0.39 | 0.46 | 0.40 | 0.40 | 0.40 | 0.35 | 0.36 | 0.41 | 0.48 |
| Particle property | Precipitation start time | s | 18 | 20 | 86 | 123 | 42 | 23 | 22 | 14 | 35 | 40 | 12 | 38 |
|  | Thermal decomposition start temperature | °C. | 316 | 322 | 323 | 325 | 314 | 320 | 322 | 322 | 321 | 322 | 320 | 321 |
|  | Sulfur atom content | ppm |  |  |  |  |  |  |  |  |  |  |  |  |
|  | Coefficient of static friction ($\mu s$) |  | 0.14 | 0.17 | 0.16 | 0.18 | 0.14 | 0.17 | 0.17 | 0.17 | 0.16 | 0.16 | 0.15 | 0.18 |
|  | Coefficient of dynamic friction ($\mu k$) |  | 0.08 | 0.08 | 0.08 | 0.12 | 0.09 | 0.08 | 0.08 | 0.08 | 0.07 | 0.08 | 0.064 | 0.082 |
|  | Delluvium rate (before the friction test) | % | 1.4 | 2.0 | 2.1 | 1.2 | 1.3 | 2.0 | 1.5 | 3.5 | 1.9 | 1.3 | 1.1 | 2.1 |
|  | Delluvium rate (after the friction test) | % | 6.0 | 5.8 | 7.9 | 6.0 | 5.4 | 6.0 | 7.0 | 10.2 | 7.7 | 8.0 | 8.7 | 8.4 |

|  |  |  | Comparative Example |  |  |  |  |  |
|---|---|---|---|---|---|---|---|---|
|  |  |  | 1 | 2 | 3 | 4 | 5 | 6 |
| Particle shape | Mass average particle size | μm | 4.8 | 4.5 | 4.5 | 4.5 | 4.6 | 4.2 |
|  | Coefficient of variation | % | 36.2 | 40.1 | 38.1 | 36.5 | 38.3 | 35.1 |
|  | Number average particle size | μm | 2.0 | 2.1 | 2.2 | 1.99 | 2.13 | 1.99 |
|  | Dn/Dw |  | 0.42 | 0.47 | 0.49 | 0.44 | 0.46 | 0.47 |
| Antioxidant | IRGANOX® 1010 content | % | 0.38 | 0.40 | 0.42 | 0.04 | 0.45 | ND |
| Particle property | Precipitation start time | s | 6 | 13 | 30 | 18 | 103 | 32 |
|  | Thermal decomposition start temperature | °C. | 320 | 297 | 323 | 299 | 320 | 275 |
|  | Sulfur atom content | ppm |  |  |  |  | 380 |  |
|  | Coefficient of static friction ($\mu s$) |  | 0.17 | 0.18 | 0.16 | 0.16 | 0.25 | 0.18 |
|  | Coefficient of dynamic friction ($\mu k$) |  | 0.08 | 0.1 | 0.08 | 0.12 | 0.18 | 0.09 |
|  | Delluvium rate (before the friction test) | % | 4.0 | 2.1 | 3.8 | 3.9 | ND | 3.3 |
|  | Delluvium rate (after the friction test) | % | 11.2 | 11.7 | 11.9 | 12.5 | ND | 11.6 |

INDUSTRIAL APPLICABILITY

The organic polymer fine particle of the present invention can suppress defluvium from a film. Therefore, the organic polymer fine particle is useful as an antiblocking agent for a resin film. The resin film containing the organic polymer fine particle of the present invention is suitably used as general packaging materials, food packaging materials such as food packaging film, and pharmaceutical packaging materials such as pharmaceutical packaging film.

The invention claimed is:

1. An organic polymer fine particle,
   comprising a (meth)acrylate polymer crosslinked by a bifunctional crosslinkable monomer and 0.2 mass % or more of a hindered phenol antioxidant or a component derived therefrom, and
   not comprising a sulfur antioxidant,
   wherein a ratio of a structure unit composed of the bifunctional crosslinkable monomer in the (meth)acrylate polymer crosslinked by the bifunctional crosslinkable monomer is 15 mass % or more and 35 mass % or less,
   the following sedimentation start time is 10 seconds or more, wherein the sedimentation start time is defined as a time from when 0.02±0.005 g of the organic polymer fine particle is gently put on the surface of 20 mL of deionized water having a temperature of 20° C. in a glass container having a cross-sectional area of 5 $cm^2$ or more and 10 $cm^2$ or less until when one of the organic polymer fine particle first begins to sediment,
   an amount of Al measured by a high-frequency inductively coupled plasma emission spectrometric analysis method is 1 ppm or less in the organic polymer fine particle, and
   a coefficient of variation of a particle size of the organic polymer fine particle is 30% or more.

2. The organic polymer fine particle according to claim 1, wherein the bifunctional crosslinkable monomer is a monomer having two (meth)acryloyl groups.

3. The organic polymer fine particle according to claim 1, wherein a mass average particle diameter is 1.0 μm or more and 15 μm or less.

4. The organic polymer fine particle according to claim 1, wherein the organic polymer fine particle is used as an anti-blocking agent for a film.

5. The organic polymer fine particle according to claim 1, wherein the bifunctional crosslinkable monomer has two polymerizable functional groups selected from the group consisting of a vinyl group and a (meth)acryloyl group.

* * * * *